(12) United States Patent
Brown et al.

(10) Patent No.: US 9,104,894 B2
(45) Date of Patent: Aug. 11, 2015

(54) HARDWARE ENABLEMENT USING AN INTERFACE

(75) Inventors: Andrew Brown, Houston, TX (US); E. David Neufeld, Magnolia, TX (US); Dwight L. Barron, Houston, TX (US); Andrew L. Fisher, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3098 days.

(21) Appl. No.: 11/303,113

(22) Filed: Dec. 16, 2005

(65) Prior Publication Data

US 2007/0188351 A1 Aug. 16, 2007

(51) Int. Cl.
| | |
|---|---|
| G06F 3/00 | (2006.01) |
| G06F 5/00 | (2006.01) |
| G06F 21/71 | (2013.01) |
| G01R 31/317 | (2006.01) |
| G01R 31/3185 | (2006.01) |

(52) U.S. Cl.
CPC ............ G06F 21/71 (2013.01); G01R 31/3172 (2013.01); G01R 31/318555 (2013.01); G01R 31/318572 (2013.01)

(58) Field of Classification Search
USPC .......................................................... 710/36
See application file for complete search history.

(56) References Cited

U.S. PATENT DOCUMENTS

| | | | | |
|---|---|---|---|---|
| 5,497,421 | A * | 3/1996 | Kaufman et al. | 713/156 |
| 5,757,918 | A * | 5/1998 | Hopkins | 705/67 |
| 5,828,824 | A | 10/1998 | Swoboda | |
| 5,949,882 | A * | 9/1999 | Angelo | 713/185 |
| 6,101,457 | A | 8/2000 | Barch et al. | |
| 6,324,649 | B1 * | 11/2001 | Eyres et al. | 726/5 |
| 6,425,101 | B1 * | 7/2002 | Garreau | 714/727 |
| 6,522,985 | B1 | 2/2003 | Swoboda et al. | |
| 6,735,514 | B2 | 5/2004 | Pepi et al. | |
| 6,778,667 | B1 * | 8/2004 | Bakhle et al. | 380/37 |
| 6,851,047 | B1 | 2/2005 | Fox et al. | |
| 6,868,532 | B2 | 3/2005 | Nadeau-Dostie et al. | |
| 6,882,950 | B1 | 4/2005 | Jennion et al. | |
| 6,886,110 | B2 | 4/2005 | O'Brien | |
| 7,080,789 | B2 * | 7/2006 | Leaming | 235/492 |
| 7,386,774 | B1 * | 6/2008 | Chatterjee et al. | 714/726 |
| 2003/0023793 | A1 | 1/2003 | Mantey et al. | |
| 2003/0046619 | A1 * | 3/2003 | Sato et al. | 714/703 |
| 2003/0163773 | A1 | 8/2003 | O'Brien et al. | |
| 2003/0212884 | A1 | 11/2003 | Lee et al. | |
| 2003/0226080 | A1 | 12/2003 | Moyer et al. | |
| 2006/0123145 | A1 * | 6/2006 | Goff | 710/8 |

* cited by examiner

*Primary Examiner* — Elias Mamo
(74) *Attorney, Agent, or Firm* — Hendricks, Slavin & Holmes LLP (57) ABSTRACT

A hardware enablement apparatus includes a processor, and a communications interface configured for writing license data to one or more data registers and for using the license data to selectively enable, under control of the processor, hardware features associated with the data registers, at least one of the data registers being implemented in non-volatile memory.

23 Claims, 3 Drawing Sheets

HARDWARE ENABLEMENT USING AN INTERFACE

BACKGROUND

Some digital devices include hardware that is enabled or capable of being enabled.

SUMMARY OF THE INVENTION

In an embodiment, a hardware enablement apparatus includes a management processor, and a communications interface configured for writing license data to one or more data registers for selectively enabling, under control of the processor, hardware features associated with the data registers, at least one of the data registers being implemented in non-volatile memory.

BRIEF DESCRIPTION OF THE DRAWINGS

Detailed description of embodiments of the present disclosure will be made with reference to the accompanying drawings.

DETAILED DESCRIPTION

The following is a detailed description for carrying out embodiments of the present disclosure. This description is not to be taken in a limiting sense, but is made merely for the purpose of illustrating the general principles of the embodiments of the present disclosure.

The present description involves apparatuses and methods for enabling optional hardware features in devices, such as integrated circuit (IC) chips, chipsets, and servers. However, it should be appreciated that the principles described herein are not limited to these types of devices. A Joint Test Action Group (JTAG) implementation provides a low-cost, small, simple, secure method of enabling Optional Hardware Enablement features that exist in a chip. Apparatuses and methods described herein facilitate standardization and protection of financial investment in technology through a flexible, encryption, validation, and authentication architecture, as well as dynamic enabling via out-of-band mechanisms.

Figure 1:
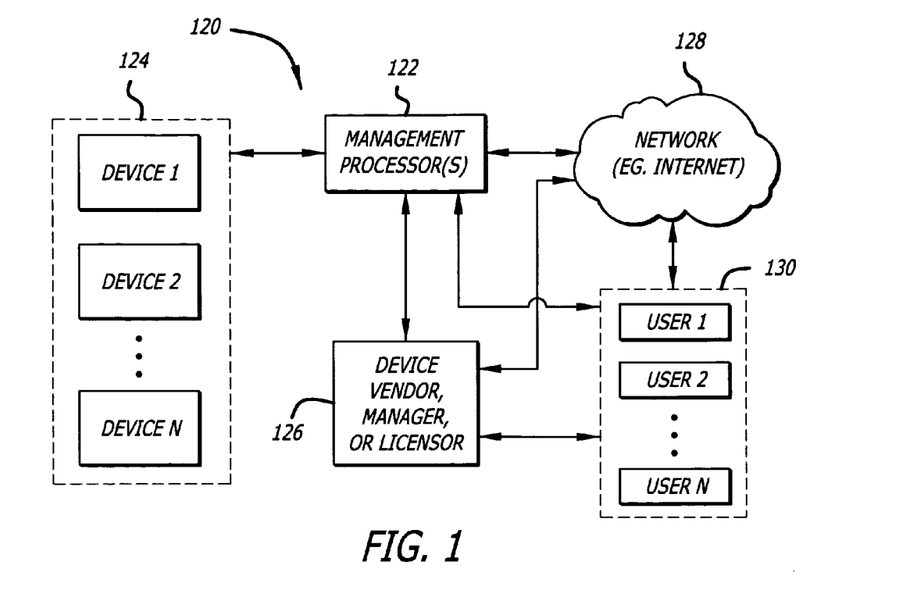
FIG. 1 is an embodiment of a hardware enablement system.

In the embodiment shown in FIG. 1, a hardware enablement system 120 includes one or more management processors 122. A communications interface (not shown in this figure) is provided between the management processor(s) 122 and one or more devices 124. A device vendor, manager, or licensor 126 (e.g., system board manufacturer) provides controls and/or provides inputs to the processor(s) 122 either directly, or via a network 128 (e.g., Internet). One or more users 130 are provided with a mechanism for selectively enabling hardware features of the devices 124, for example, communicating directly with the management processor(s) 122, or indirectly via the device vendor, manager, or licensor 126 and/or the network 128.

Figure 2:
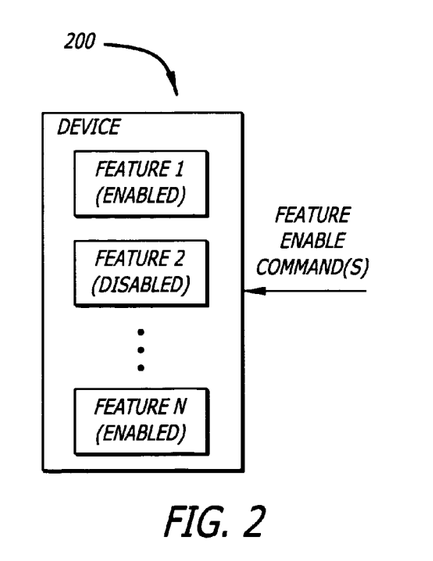
FIG. 2 conceptually illustrates a device with hardware features selectively enabled.

FIG. 2 conceptually illustrates a device 200 with hardware features selectively enabled (in this example, Feature 1 and Feature N are enabled, and Feature 2 is disabled) under control of feature enable command(s) provided via the communications interface between the device and the management processor(s). Embodiments described herein provide the ability to enable and disable hardware features (e.g., in the field) to achieve cost-savings, develop new revenue streams, and/or provide an infrastructure to build upon for Adaptive Infrastructure. The devices can be different types of devices and from different vendors. Embodiments are configured to allow single (e.g., individual server) enablement of features, entity-wide (e.g., corporate-wide) enablement of features, or global enablement. In an embodiment, the tools that enable these features scale from the individual computer to the corporate and global levels.

Figure 3:
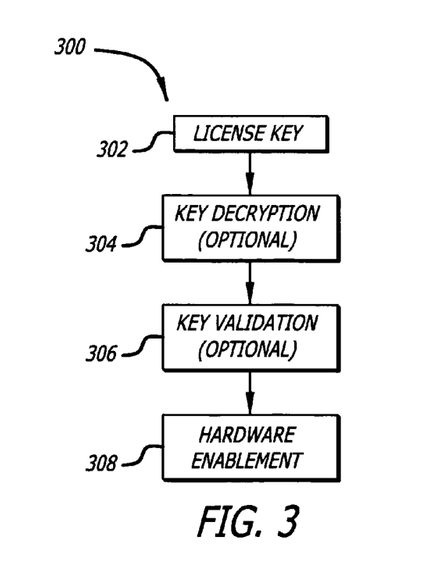
FIG. 3 is a flow diagram of a hardware enablement method.

FIG. 3 is a flow diagram of a hardware enablement method 300. At step 302, a license key pertaining to a particular hardware feature or features is provided to the device via the communications interface. The process of obtaining the license key should be secure in order to protect the investment that the key represents, namely, the technology and feature(s) of the device supplier. Thus, prior to hardware enablement (step 308), an encrypted license key is decrypted (step 304) and validated (step 306), providing an appropriate protocol to ensure that the data for enabling hardware features is not stolen. As described below in greater detail, the management processor(s) 122 communicates with the devices 124 and is responsible for applying and removing the licensing key and for managing asset information.

The communications interface between the management processor(s) 122 and the devices 124 should be low-cost, scalable, and secure, and impose minimal burdens on device vendors. In an embodiment, a JTAG (IEEE 1149.1) interface is used to provide the physical and logical communication mechanism. The use of JTAG as described herein potentially provides a low-cost and minimally burdensome communications interface solution. Prior to discussing the configuration and function of the embodiments described herein, a brief discussion of JTAG boundary-scan architecture and operation is in order.

Figure 4:
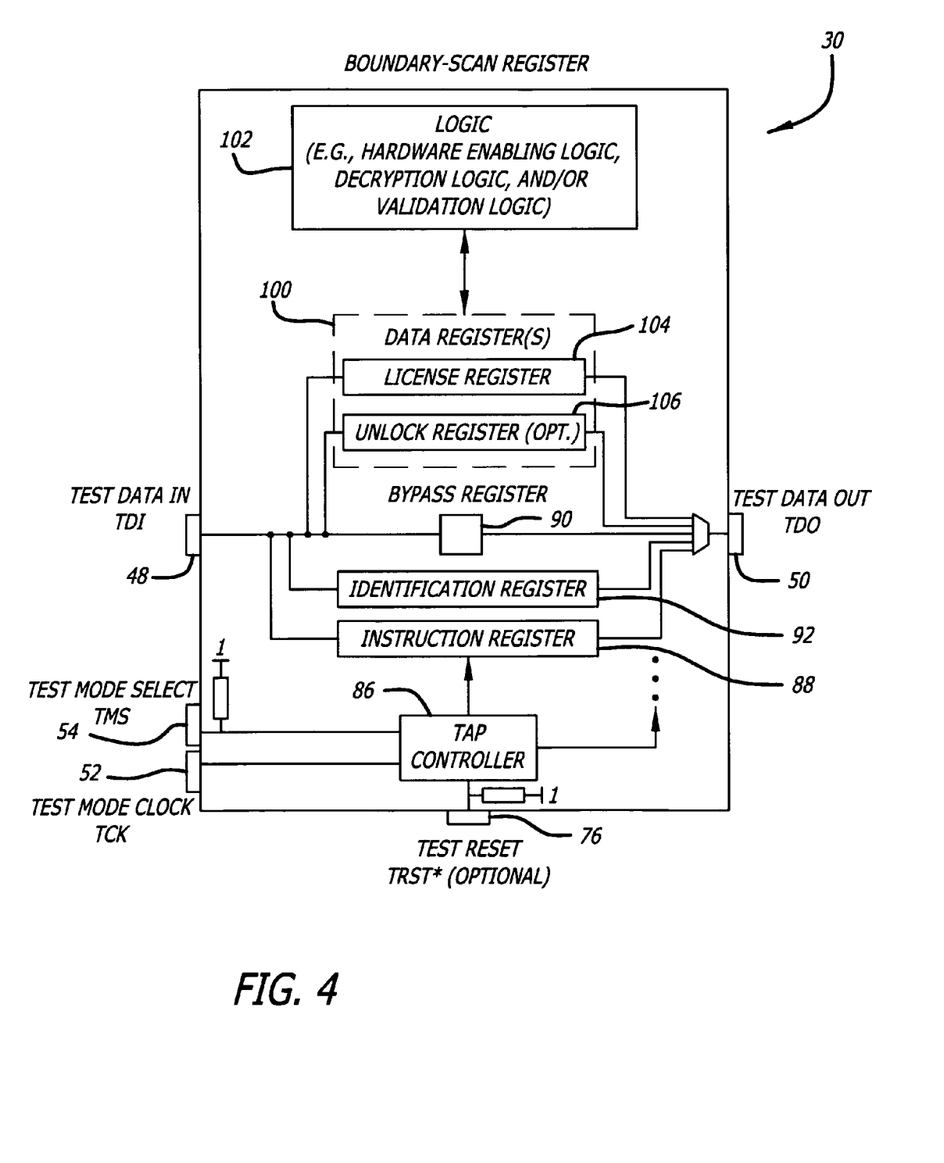
FIG. 4 is an embodiment of a digital device which includes a TAP controller and a license register.

Turning now to FIG. 4, a digital device 30 (e.g., which utilizes the JTAG architecture) includes Test Data In (TDI) 48, Test Mode Select (TMS) 54, Test Clock input (TCK) 52, Test Data Out (TDO) 50—and an optional test pin Test Reset (TRST) 76. These pins are collectively referred to as the Test Access Port (TAP).

In this embodiment, the digital device 30 include a finite-state machine TAP controller 86 having TCK 52, TMS 54, and optionally, TRST 76, inputs. A n-bit Instruction Register (IR) 88 is provided to hold a current instruction. A 1-bit bypass register (Bypass) 90 is provided, and optionally, a 32-bit Identification Register (Ident) 92, capable of being loaded with a permanent device identification code, may also be included.

In this embodiment, the digital device 30 includes one or more data registers 100 and logic 102. For example, the one or more data registers 100 include a license register 104 and an unlock register 106 (optional). In an embodiment, the one or more data registers 100 are provided by non-volatile memory, e.g., non-volatile random access memory (NVRAM). In an embodiment, the logic 102 includes hardware enabling logic, decryption logic and/or validation logic.

The selected register is identified by the decoded output of the IR. Certain instructions are mandatory, such as Extest (boundary-scan register selected), whereas others are optional, such as the Idcode instruction (Ident register selected).

In operation, encrypted license register data is written to the license register 104 (e.g., by a management processor). The decryption logic is used to generate decrypted data from the license register 104. In an embodiment, the logic 102 is configured such that the resulting decrypted license must also pass validation. For example, the validation logic performs one or more of checking particular bits, checksums, signatures, or other validation procedures before enabling the hardware enabling logic. In an embodiment, a hardware feature is enabled (or disabled) based upon examination of the output of the validation logic and the decryption logic. Features can be enabled/disabled through many mechanisms, some of which may include: hold RESET signals of hardware blocks to avoid operation, disconnecting inputs/outputs, stopping clocks, disabling PCI registers that would be required for communication, etc.

Figure 5:
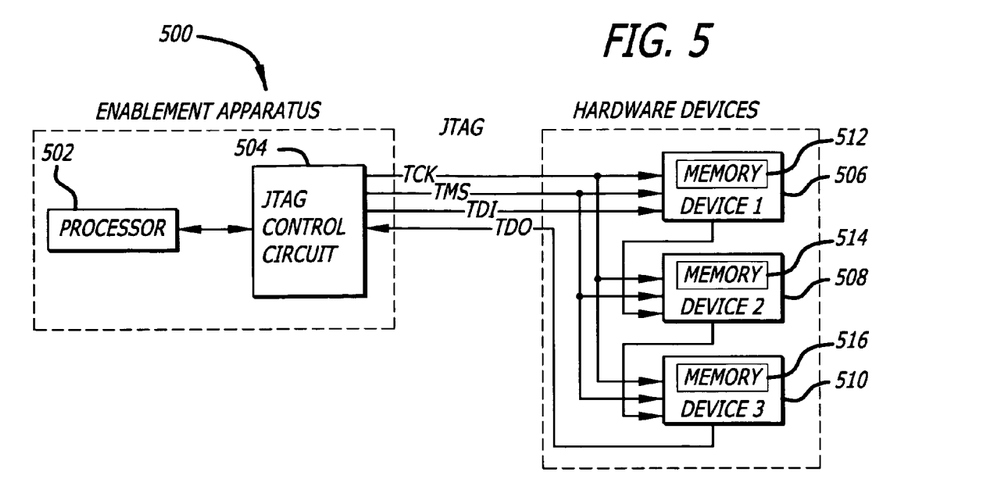
FIG. 5 is an embodiment of a hardware enablement apparatus which utilizes a communications interface with a chained topology.

Referring now to FIG. 5, in an embodiment described herein, a hardware enablement apparatus 500 includes a processor 502 (e.g., management processor) and a JTAG control circuit 504. Devices 908, 910 and 912 are connected to the JTAG control circuit 906 in a chained topology as shown, and each include (or are provided with access to) memory devices 512, 514 and 516, respectively. In an embodiment, the memory devices are non-volatile.

The JTAG interconnect is used to communicate between the Devices 506, 508 and 510 (e.g., Vendor Chips) and the processor 502 (e.g., Management Chip). In an embodiment, the JTAG signals include TCK, TMS, TDO, TDI, and an optional TRST. The JTAG lines provide for a flexible design that allows data size to vary from device to device, and allows for the connection of multiple devices on the same JTAG circuit. This allows for different devices from various vendors to be connected and communicated with without having additional signals on the management controller or on the devices. In an embodiment, the Vendor Chip is connected to the Management Processor via a communications path that uses the JTAG specification.

In an embodiment, the data on the JTAG line is considered in "plain-text" and, in order to achieve a required or desired level of security, the device providers (e.g., vendors) implement appropriate authentication, encryption, and validation in the hardware, at a level below the Tap Controller and JTAG registers.

The primary component of JTAG is the implementation of the TAP Controller in the chip or other device. This provides a simple state machine implementation to select different instruction and data registers.

In an embodiment, the JTAG Tap Controller is used to provide hardware enablement features. In an embodiment, the TAP Controller is a state machine operated by the TCK and TMS signals. Control of the input signals allows for the selection, output, input, and change of various instruction registers (IR) and data registers (DR).

In an embodiment, the hardware enablement apparatus 500 uses the JTAG specification to provide a communications interface between the processor 202 (Management Processor) and the devices 506, 508 and 510 (e.g., Vendor Chips). In an embodiment, the Management Processor is configured to identify the Vendor Chip that is being communicated with, and to obtain existing feature information and update license information in order to enable or disable features. In an embodiment, the hardware enablement apparatus 500 provides a communication path to the Internet and/or other network to allow for asset management, chargeback, license updates, etc.

In an embodiment, the management processor is an Integrated Lights-Out management processor, available from Hewlett-Packard Company of Palo Alto, Calif., which contains a JTAG master. Integrated Lights-Out (iLO) is an autonomous management processor that resides on the system board of a host server. Security features are built into iLO using multiple layers that encompass the hardware, firmware, communication interfaces, and deployment capabilities.

In an embodiment, the IDCODE register (optional in the JTAG specification) is used to provide device identification information, and at least one additional register, e.g., a LICENSE data register, is added to facilitate enablement of hardware features. In an embodiment, these registers are part of the TAP controller and registers (as in FIG. 4, for example).

In an embodiment, the IDCODE register allows for the identification of specific chips, providing information such as vendor, chip design, version, revision, etc. The register is defined to be 32 bits, and the various fields are defined by the IEEE specification.

In an embodiment, a LICENSE instruction is used to select the LICENSE data register. The specific bit-pattern for the LICENSE instruction may differ from device to device (e.g., chip to chip) and, in an embodiment, is defined by the device vendor. Since the Instruction Register length is not defined by the IEEE specification, the length and value of the LICENSE instruction must be provided. Using the LICENSE instruction allows the data in the data register (corresponding to license information) to be read or changed.

The LICENSE data register provides the ability for the management processor to both read the current license data and to change the applied license. The LICENSE data register can be defined, for example, to be one of 16, 32, or 64 bits (see examples below in Tables 1, 2 and 3). The length can vary depending upon the features of the device. During read operations current state and license information is provided. Some of these bits may be hard-coded, while some may represent current license information. During a JTAG update operation, the data being written to update the LICENSE data register indicates a new license, and does not directly alter the data register, but instead drives inputs to the license hardware. The license hardware may be something that simply updates the license enable-bits, or a complex, secure verification mechanism.

TABLE 1

16-bit Register

| Loc | Bit | Description |
|---|---|---|
| 0:1 | REGLEN | Register Length-These bits are used to identify the length of the LICENSE register. 00-reserved, 01-16 bits, 10-32 bits, 11-64 bits |
| 2:5 | ENCMETH | Encryption Method-Describes the encryptions method used by the management processor in order to securely protect the license data. In an embodiment, the management processor and chip may have pre-arranged shared secrets in order to inter-operate correctly. |
| 6:10 | Feature 1 | Feature-Five bits are used to describe a feature. The lowest bit indicates whether the feature is disabled (0) or enabled (1). The high 4 bits provide an identifier to describe the feature. The identifier, along with unique information obtained from the IDCODE information provides a unique identifier for the feature. |

TABLE 1-continued 16-bit Register

| Loc | Bit | Description |
|---|---|---|
| 11:15 | Feature 0 | Feature-Five bits are used to describe a feature. The lowest bit indicates whether the feature is disabled (0) or enabled (1). The high 4 bits provide a identifier to describe the feature. The identifier, along with unique information obtained from the IDCODE information provides a unique identifier for the feature. |

TABLE 2

32-bit Register

| Loc | Bit | Description |
|---|---|---|
| 0:1 | REGLEN | Register Length-These bits are used to identify the length of the LICENSE register. 00-reserved, 01-16 bits, 10-32 bits, 11-64 bits |
| 2:5 | ENCMETH | Encryption Method-Describes the encryptions method used by the management processor in order to securely protect the license data. In an embodiment, the management processor and chip may have pre-arranged shared secrets in order to inter-operate correctly. |
| 6:10 | Feature 4 | Feature-Five bits are used to describe a feature. The lowest bit indicates whether the feature is disabled (0) or enabled (1). The high 4 bits provide a identifier to describe the feature. The identifier, along with unique information obtained from the IDCODE information provides a unique identifier for the feature. |
| 11:15 | Feature 3 | |
| 16:20 | Feature 2 | |
| 21:25 | Feature 1 | |
| 26:30 | Feature 0 | |
| 31 | Reserved | Read as 0's |

TABLE 3

64-bit Register

| Loc | Bit | Description |
|---|---|---|
| 0:1 | REGLEN | Register Length-These bits are used to identify the length of the LICENSE register. 00-reserved, 01-16 bits, 10-32 bits, 11-64 bits |
| 2.5 | ENCMETH | Encryption Method-Describes the encryptions method used by the management procssor in order to securely protect the license data. In an embodiment, the management processor and chip may have pre-arranged shared secrets in order to inter-operate correctly. |
| 6:10 | Feature | Feature-Five bits are used to describe a feature. The lowest bit indicates whether the feature is disabled (0) or enabled (1). The high 4 bits provide a identifier to describe the feature. The identifier, along with unique information obtained from the IDCODE information provides a unique identifier for the feature. |
| 11:15 | Feature | |
| 16:20 | Feature | |
| 21:25 | Feature | |
| 26:30 | Feature | |
| 31:35 | Feature | |
| 36:40 | Feature | |
| 41:45 | Feature | |
| 46:50 | Feature | |
| 51:55 | Feature | |
| 56:60 | Feature | |
| 61:62 | Reserved | Read as 0's |

REGLEN is a field in the 3 example structures depicted above. The field, in the examples, is implemented as a 2 bit field, allowing the ability to indicate 16, 32, or 64 bit lengths for the LICENSE register. The reserved value 00 allows for future variation. REGLEN provides the flexibility to accommodate smaller devices that may not have gate space. In another embodiment, a standard is set at N (e.g., 64-bits) and only the necessary bits are implemented and the rest can be don't care and shifted in, for example, without latches being implemented. In this example embodiment, where N bits are defined for the LICENSE register, the hardware may only need to implement less than the total number of Features (11) as shown in the depicted table. During the UPDATE DR phase of the TAP controller, only the necessary bits supported need to be latched into the LICENSE register. The other bits that do not apply do not need to be latched.

WRITE Data

TABLE 4

16-bit Register

| Loc | Bit | Description |
|---|---|---|
| 15:0 | License Data | License Data-The license data is contained in this field. The data, if applicable, will have been encrypted by the encryption method selected by the ENCMETH field in the read of the LICENSE DATA REGISTER. |

TABLE 5

32-bit Register

| Loc | Bit | Description |
|---|---|---|
| 31:0 | License Data | License Data-The license data is contained in this field. The data, if applicable, will have been encrypted by the encryption method selected by the ENCMETH field in the read of the LICENSE DATA REGISTER. |

TABLE 6

64-bit Register

| Loc | Bit | Description |
|---|---|---|
| 63:0 | License Data | License Data-The license data is contained in this field. The data, if applicable, will have been encrypted by the encryption method selected by the ENCMETH field in the read of the LICENSE DATA REGISTER. |

In an embodiment, an UNLOCK data register is provided in addition to the LICENSE data register. In an embodiment, the UNLOCK data register is part of the TAP controller and registers (as in FIG. 4, for example).

The UNLOCK register is implemented to address concerns regarding REPLAY ATTACKS. The UNLOCK register provides the ability for the management processor to obtain SEED information in order to complete a CHALLENGE/RESPONSE in order to prove authenticity. The UNLOCK register, when read, provides the CHALLENGE or SEED data. This data is used the management processor in order to produce an acceptable RESPONSE. The mechanism used to produce the correct response is partially indicated by the UNLOCK register and, for example, varies from vendor to vendor, and from device to device (e.g., chip to chip).

During a write (register update) of the UNLOCK register, the data is verified for being the correct RESPONSE. If the data is valid, the LICENSE register will be unlocked and activated for accepting of new license data. If the response is invalid, then the LICENSE register will remain locked and will not support new license data. This prevents the ability of replay attacks with license data. Alternately, the use of a random number or seed to provide unlock functionality can be integrated with the license application, rather than provided as a separate operation.

The validity of the UNLOCK register may be performed by comparing the output of a known algorithm with known data. If the management processor and device have a shared secret, only a management processor with the shared secret will be able to write valid data to the UNLOCK register.

(SEED+shared_secret)=>encryption_method (MD5 or other)==valid UNLOCK data

The device knows the SEED and shared_secret and encryption_method. It can calculate the valid UNLOCK data internally.

The device compares the UNLOCK value written by the management processor to this internally calculated value. If the values match, the UNLOCK data is valid, and the LICENSE register can be activated.

The LICENSE register can be activated by enabling the WRITE_ENABLE bits, the IR decode corresponding to the LICENSE register, or an alternative mechanism that enables the LICENSE register.

In an embodiment, the length of the UNLOCK register is specified for a particular device. For example, the register must be at least 8 bits, and the first 16 bits of the register indicate how many bits of CHALLENGE data there are. See also, example below. The number of challenge bits may be less than the total size of the register. The size of the challenge data can be less than the response data. In addition to the challenge data, the shared secret information may be used to produce the correct response. Normal hash algorithms produce significantly more bits of data in order to ensure security.

TABLE 7

8-bit Register

| Loc | Bit | Description |
|---|---|---|
| 15:8 | SEED_LEN | SEED Length-Number of bits of data that follow that should be used for the CHALLENGE. |
| 7:0 | Algorithm | Algorithm-Refer to Algotihm Table for enumerated algorithms |

TABLE 8

128-bit Register

| Loc | Bit | Description |
|---|---|---|
| 127:120 | SEED_LEN | SEED Length-Number of bits of data that follow that should be used for the CHALLENGE. |
| 7:0 | Algorithm | Algorithm-Refer to Algotihm Table for enumerated algorithms |
| 119:0 | SEED_DATA | SEED Data-CHALLENGE data |

Example: An UNLOCK register that is 128-bits long with 48 bits of CHALLENGE data would have as the first byte a value of 0x30 (48 decimal). If the expected challenge algorithm is MD5, the value of the $2^{nd}$ byte will be 0xGG as per the Algorithm Table (below). The following 48 bits of data would contain the CHALLENGE data. The remaining 72 bits of data would read as 0.

TABLE 9

Feature Table

| Loc | Bit | Description |
|---|---|---|
| 4:1 | Feature Information | The Feature information provides an enumeration of the specific feature. |
| 0 | State | The State field indicates whether the feature is currently enabled (1) or disabled (0). |

TABLE 10

Algorithm Table

| Loc | Bit | Description |
|---|---|---|
| 4:0 | Algorithm | 00000-No algorithm required.<br>00001-UNLOCK response is MD5 (SEED + secret)<br>00010-UNLOCK response is SHA-1 (SEED + secret)<br>00011-UNLOCK response is MAPPING(SEED). The mapping function is shared between the chip vendor and the management processor. In order to provide unique UNLOCK codes for individual chips, the SEED information will be unique (SN, sequential, or other) for each chip, e.g., hard-coded at manufacture.<br>11111-Reserved |

TABLE 11

Encryption Table

| Loc | Bit | Description |
|---|---|---|
| 4:0 | Algorithm | 00000-No encryption algorithm.<br>00001-License data is encrypted with RC-2.<br>00010-License data is encrypted with RC-4<br>00011-License data is encrypted with DES<br>00100-License data is encrypted with 3-DES.<br>00101-License data is encrypted with<br>The encryption algorithms require a shared secret. The secret may be specific for a Vendor, Chip Model, or individual chip (Serial Number).<br>11111-Reserved |

The management processor collects asset information via the JTAG interface. In an embodiment, implementation of the IDCODE register allows the processor to obtain manufacturer, chip, revision, and other information. Additionally, the LICENSE register is implemented which allows additional information to be obtained; in an embodiment, this register contains license information, encryption specifications and seeds. In an embodiment, the memory is non-volatile and is used to store the Hardware Enabling License, which eliminates the need to execute enablement features each reset cycle. Referring to FIG. 5, by connecting a non-volatile memory to the Device, the management processor will not need to execute the enablement feature upon each reset.

In operation, the management processor sets the Instruction Register to the IDCODE instruction and serially scans out the IDCODE information. The management processor then sets the Instruction Register to the LICENSE instruction and serially scans out the LICENSE information. This information, in conjunction with the Feature Table, can fully describe the device (e.g., chip) and enabled features.

In order to obtain seed information, the management processor sets the instruction register to LICENSE, and reads the UNLOCK register until to obtain the SEED information. In an embodiment, the SEED register is indicated by a 1 bit in the MSB of the LICENSE register. The type of seed and seed data is obtained by the read of the SEED data.

In order to avoid the possibility of replay attacks, the SEED information is used as a challenge/response mechanism to authenticate the management processor. The ability to WRITE license data of any type to the LICENSE register is disabled until the challenge/response is met. The management processor obtains the SEED (challenge) from the LICENSE register. This data is manipulated in order to provide the response data that the chip can validate. If the data is valid, the writes to the LICENSE are enabled. If the data is not valid, the response is not met, and writes to the LICENSE register are not enabled. When writes are disabled, normal JTAG operations will continue, but the data to the LICENSE data will not be latched. In order to avoid brute force attacks of the challenge/response, the SEED can be changed (e.g., after every 5 attempts at writing the UNLOCK register).

The enabling and disabling of features takes place whenever license data is written to the LICENSE register. The data may be encrypted as specified by the LICENSE (read), and may also be gated by the UNLOCK register. The format of the license data can vary from vendor to vendor of the device. In an embodiment, regardless of the selection of encryption (including off), the data itself has some mechanism for self-validation. For example, parity bits, checksum, CRC-16, CRC-32, or other validation mechanism can be used to ensure the integrity of the data. Any data that does not correctly validate will be ignored by the licensing component of the hardware.

Referring again to FIG. 3, the hardware enablement method 300 is further described. Upon obtaining a license key at step 302, steps 304, 306 and 308 are performed to ensure that the key meets the requirements (e.g., provided by the device vendor) for data security, validity and features, respectively. The Key is applied via the Instruction Register and Data Register steps. When the IR has selected the key field, and the Tap Controller performs the UPDATE DR state, the key can be thought of as being applied. Upon this update, the internal chip processes are started.

The key decryption process 304, if implemented, decrypts the provided data. In an embodiment, the cipher implemented to decrypt (and encrypt) as defined by the LICENSE register is used. In an embodiment, the secret used for encryption/decryption is implemented in hardware in order to produce the raw key data for the validation process 306.

The key validation process 306, if implemented, is performed by the hardware to verify that the contents of the key are correct, and that the key data is valid. This check may involve a parity or bit check, checksum, CRC, or other validation schemes as implemented by the hardware vendor.

In an example embodiment, dynamic licensing capability is provided. By way of example, it may be a requirement of certain hardware that a reset or other operation needs to be performed by enabling a component or disabling a component. In this case the licensing attributes take effect immediately in the device, but the enablement or disablement of the feature may not take place until the hardware requirement is met, e.g., a power cycle. In an embodiment, the hardware enablement methodology can be specific for each vendor. The contents of the license key, after decryption and validation, drive the enablement of different features. For example, bits in the validated key drive internal chip signals that enable/disable features. In an embodiment, the enabling of a feature does not interrupt or adversely effect current operation, thus accommodating a potentially dynamic licensing process. If the features licensing state cannot be altered during certain states of the vendor's chip or other device, in an embodiment, the vendor is responsible for preventing the condition. In an embodiment, the licensing agent (management processor) determines the success or failure of the new key by evaluating the LICENSE register and scanning the enabled or disabled features.

Figure 6:
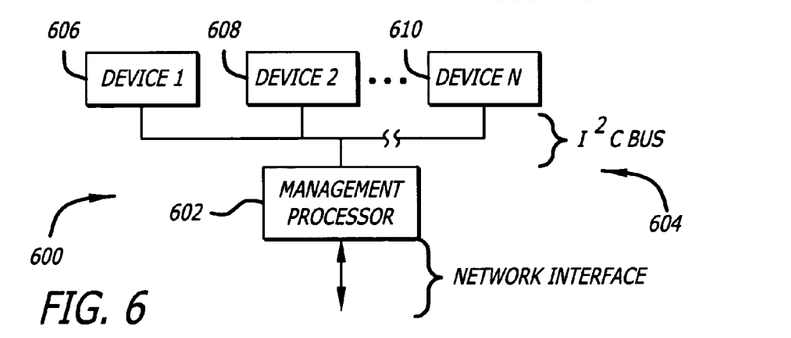
FIGS. 6 and 7 show an embodiment of a hardware enablement apparatus which utilizes an Inter-IC ($I^2C$) hardware architecture.
Figure 7:
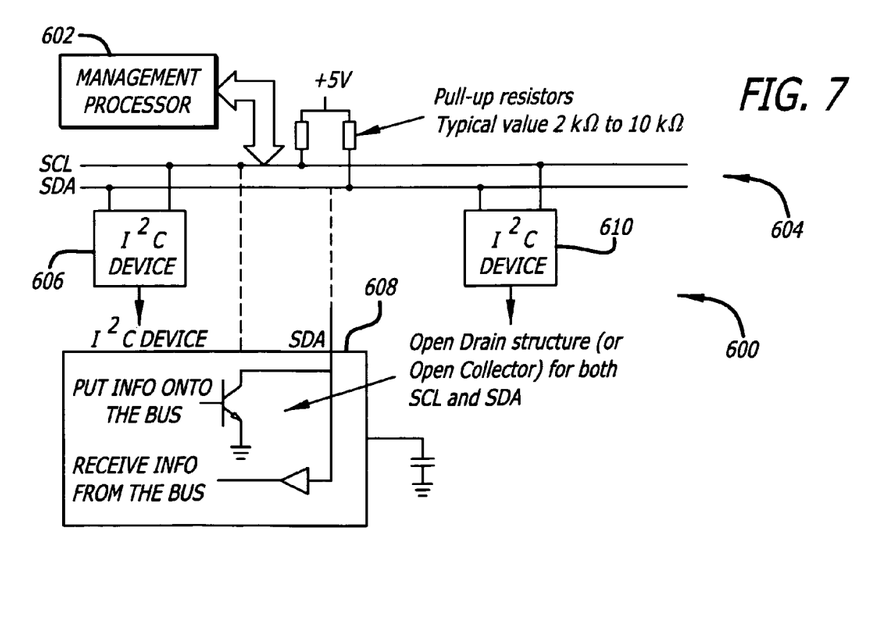

Referring now to FIG. 6, in an embodiment described herein, a hardware enablement apparatus 600 includes a management processor 602. Devices 606, 608 and 610 are connected to the management processor 602 in a bus topology as shown. In this embodiment, a bus 604 implemented with the Inter-IC ($I^2C$) hardware architecture (as shown in greater detail in FIG. 7) is used to provide a communications interface between the management processor 602 and the devices 606, 608 and 610.

The use of $I^2C$ will require additional pins (e.g., two) for each vendor chip or other device. If $I^2C$ is used as an alternative to JTAG, the hardware required to operate an $I^2C$ slave or $I^2C$ master (or both) would be required. In the case of an $I^2C$ slave implemented in the hardware, the feature can be similar to an $I^2C$ EEPROM, where appropriate registers are implemented to read/write licensing data. In an embodiment, this capability operates independently of regular chip operation, e.g., both on auxiliary power and full system power conditions.

For $I^2C$, if the devices are to exist on the same $I^2C$ bus, the slave address of the device is configured, or a mechanism can be provided for resolving conflicts of addressing (e.g., automatically). For example, the Peripheral Component Interconnect (PCI) System Management Bus (SMBus) address resolution protocol (ARP) scheme can be used.

Where $I^2C$ master features are implemented in the chip or other device, protocols implemented around arbitration and collision recovery can also be provided. However, the implementation shown in FIG. 6 involves the management processor 602 being the master, and communicating with the various devices 606, 608, 610 (as $I^2C$ slaves).

The $I^2C$ solution may have some benefits of JTAG regarding the routing of the signals throughout the board. The $I^2C$ signals are specified as going to PCI connectors, and on some platforms are connected to DIMMS. This may ease the ability of integrating peripheral cards and removable components into an optional hardware enablement scheme using $I^2C$.

When $I^2C$ is chosen as the communication path between a management controller and the chip, the majority of the issues, protocols, and features discussed above would be the same. There would be a register definition ($I^2C$ addresses and $I^2C$ offsets) that would be standardized. These would correlate to the different JTAG registers as defined above. The same issues regarding security, replay attacks, and other issues would apply to an $I^2C$ implementation and a JTAG implementation in the same manner.

In an embodiment, the interface between the management processor 602 and the devices 606, 608 and 610 use the $I^2C$ interface which is (relative) simple to implement in hardware and available, and has a small pin-count requirement (2).

In one implementation, the registers previously discussed with reference to the JTAG communications interface would still be made available, but via the $I^2C$ interface instead of the JTAG interface. The hardware would be connected in similar fashion to the decrypt, verify, license, etc. registers.

The JTAG interface provides a method of identifying registers for operation using the IR (instruction register). The IR-SCAN/UPDATE-IR and DR-SCAN/UPDATE-DR states of the TAP controller logic.

A method in the I²C protocol could use the standard bus cycles similar to that of standard EEPROM devices where the first n-bytes (1 in this case) of the WRITE transaction indicate the register to update. Subsequent writes allow sequential registers to be updated (where all registers are 8-bits). This approach could have LICENSE at offset 0x00, UNLOCK at 0x10, FEATURE and 0x30, and so forth. Thus examples are provided below in terse I²C transaction nomenclature to operate on these registers. The operational length of these registers should be known in practice.

Read License
    ADDR_R WRITE__0x00 STOP RSTART RBYTE_0 RBYTE_1 RBYTE2 . . .

Write License
    ADDR_W WRITE__0x00 WLICENSE_BYTE_0 WLICENSE_BYTE_1 WLICENSE_BYTE2 . . .

Read Feature
    ADDR_R WRITE__0x30 STOP RSTART RFEATURE_0 RFEATURE_1 RFEATURE2 . . .

In other embodiments, a General Purpose Input/Output (GPIO) interface can be implemented. For example, discrete GPIOs can be used to enable or disable a feature. The GPIO has a one-to-one solution, where each device-feature requires a signal/pin from the management processor. The routing complexity for a GPIO solution becomes large if device-features are numerous.

Although embodiments of the present disclosure have been described in terms of the embodiments above, numerous modifications and/or additions to the above-described embodiments would be readily apparent to one skilled in the art. It is intended that the scope of the claimed subject matter extends to all such modifications and/or additions.

What is claimed is:

1. An apparatus, comprising:
a non-volatile memory;
a processor coupled to the non-volatile memory; and
a hardware communications interface coupled between the processor and a hardware device and, in response to control signals received from the processor, operable to perform operations comprising writing to the non-volatile memory license data that is associated with at least one respective hardware feature of the hardware device, and generating from the license data one or more outputs that selectively enable the at least one hardware feature of the hardware device; and
wherein the non-volatile memory provides an unlock data register, and the communications interface is operable to perform operations comprising storing validation information associated with the license data in the unlock data register, and comparing the validation information with an internally calculated value in order to enable the writing of the license data to the non-volatile memory.

2. The apparatus of claim 1, wherein the communications interface includes a Test Logic Interface.

3. The apparatus of claim 1, wherein the communications interface has a Test Access Port and Boundary-Scan Architecture.

4. The apparatus of claim 1, wherein the communications interface uses a Serial Bus Data Transfer Protocol.

5. The apparatus of claim 1, wherein the communications interface uses a chained topology.

6. The apparatus of claim 1, wherein the communications interface is a Joint Test Action Group (JTAG) interface.

7. The apparatus of claim 1, wherein the communications interface is an Inter-IC (I2C) interface.

8. The apparatus of claim 1, wherein the non-volatile memory provides custom registers within a test access port and boundary-scan architecture.

9. The apparatus of claim 1, wherein the non-volatile memory provides a license data register.

10. A method, comprising:
writing encrypted license data to one or more data registers;
in hardware logic having an input coupled to the one or more data registers and an output, performing decryption and validation processes on the license data and generating at the output of the hardware logic one or more outputs that selectively enable at least one hardware feature of a hardware device in response to successive decryption and validation of the license data; and
selectively enabling the at least one hardware feature by applying the one or more outputs to the hardware device.

11. An apparatus comprising:
a non-volatile memory;
a processor coupled to the non-volatile memory;
a hardware communications interface coupled between the processor and a hardware device and, in response to control signals received from the processor, operable to perform operations comprising writing to the non-volatile memory license data that is associated with at least one respective hardware feature of the hardware device, and generating from the license data one or more outputs that selectively enable the at least one hardware feature of the hardware device;
the hardware device comprising at least one register that controls enablement and disablement of at least one optional hardware feature of the hardware device based on the bit settings of the register; and
in response to control signals received from the processor, the hardware communications interface is operable to perform operations comprising writing to the non-volatile memory license data that is associated with the at least one optional hardware feature of the hardware device, and generating from the license data one or more outputs that selectively enable the at least one optional hardware feature of the hardware device.

12. The apparatus of claim 1, wherein the hardware device either is an integrated circuit chip or an integrated circuit chipset.

13. The apparatus of claim 1, wherein the license data comprises bits that drive the one or more outputs that selectively enable the at least one hardware feature of the hardware device.

14. The apparatus of claim 11, wherein the communications interface uses a chained topology.

15. The apparatus of claim 11, wherein the non-volatile memory provides custom registers within a test access port and boundary-scan architecture.

16. The apparatus of claim 11, wherein the non-volatile memory provides a license data register.

17. The apparatus of claim 11, wherein the hardware device either is an integrated circuit chip or an integrated circuit chipset.

18. The apparatus of claim 11, wherein the license data comprises bits that drive the one or more outputs that selectively enable the at least one hardware feature of the hardware device.

19. The method of claim 10, comprising writing the encrypted license data to a license register.

20. The method of claim 10, comprising enabling the hardware feature by releasing a reset signal, connecting inputs and/or outputs, starting a clock, or enabling a PCI register, or any combinations thereof.

21. The method of claim 10, comprising opening a communication path to the internet, a local area network, or other network.

22. The method of claim 10, comprising providing a communications interface between a management processor and the hardware device using a JTAG specification.

23. The method of claim 10, comprising using an unlock register to complete a challenge/response to prove authenticity.

* * * * *

UNITED STATES PATENT AND TRADEMARK OFFICE
CERTIFICATE OF CORRECTION

PATENT NO.        : 9,104,894 B2                                        Page 1 of 1
APPLICATION NO.   : 11/303113
DATED             : August 11, 2015
INVENTOR(S)       : Andrew Brown et al.

It is certified that error appears in the above-identified patent and that said Letters Patent is hereby corrected as shown below:

In Specification,

In column 8, line 4 approx., insert -- In an embodiment, the hardware enablement apparatus 900 uses a FEATURE table (see example below) which, for example, can be specific for each device vendor and device. In an embodiment, manufacturer information is obtained from the LICENSE register as implemented by the device vendor. The FEATURE information corresponds to descriptive text for each feature. --, therefor.

In column 8, line 15 approx., insert -- In an embodiment, the Hardware enablement apparatus 900 uses an Algorithm Table (see example below) which indicates the appropriate hash or encryption method used by the management processor in order to ensure that valid requests are accepted. The selection of the algorithm can be arranged through prior knowledge, or the TAP controller device can contain a register to provide this information. This SEED provides the appropriate data to ensure that replay attacks cannot take place. In an embodiment, the generation of the SEED must be valid indefinitely after the last read of the LICENSE register. In an embodiment, the Algorithm information is obtained from the LICENSE register as implemented by the device vendor. --, therefor.

In column 8, line 30 approx., insert -- In an embodiment, the hardware enablement apparatus 900 uses an Encryption Table (see example below in Table 11) which indicates the appropriate encryption scheme. --, therefor.

Signed and Sealed this
Seventeenth Day of May, 2016

Michelle K. Lee
*Director of the United States Patent and Trademark Office*